United States Patent
Umemura et al.

(10) Patent No.: US 8,907,012 B2
(45) Date of Patent: Dec. 9, 2014

(54) PRODUCTION METHOD FOR PARTICLE BOARD AND FIBER BOARD

(75) Inventors: Kenji Umemura, Uji (JP); Etsuya Yasui, Tokyo (JP)

(73) Assignees: Kyoto University, Kyoto-shi (JP); Sumitomo Forestry Co., Ltd., Tokyo (JP)

( * ) Notice: Subject to any disclaimer, the term of this patent is extended or adjusted under 35 U.S.C. 154(b) by 0 days.

(21) Appl. No.: 13/979,018

(22) PCT Filed: Nov. 7, 2011

(86) PCT No.: PCT/JP2011/075595
§ 371 (c)(1),
(2), (4) Date: Jul. 10, 2013

(87) PCT Pub. No.: WO2012/098749
PCT Pub. Date: Jul. 26, 2012

(65) Prior Publication Data
US 2013/0281622 A1    Oct. 24, 2013

(30) Foreign Application Priority Data

Jan. 20, 2011 (JP) .................................. 2011-009924

(51) Int. Cl.
| | |
|---|---|
| *E04C 2/16* | (2006.01) |
| *B29D 7/00* | (2006.01) |
| *C08K 5/053* | (2006.01) |
| *C08K 5/092* | (2006.01) |
| *C08K 5/29* | (2006.01) |
| *C08K 5/32* | (2006.01) |
| *C08K 7/02* | (2006.01) |
| *C08L 97/02* | (2006.01) |
| *B29C 43/00* | (2006.01) |

(52) U.S. Cl.
CPC ... *E04C 2/16* (2013.01); *C08K 5/29* (2013.01); *B29C 43/003* (2013.01); *C08L 97/02* (2013.01); *B29D 7/00* (2013.01)
USPC ............ 524/875; 524/871; 524/879; 264/330

(58) Field of Classification Search
CPC .......... C08K 5/092; C08K 5/053; C08K 5/29; C08K 5/32; C08K 7/02; E04C 2/16
See application file for complete search history.

(56) References Cited

U.S. PATENT DOCUMENTS

| | | | |
|---|---|---|---|
| 2003/0176517 A1* | 9/2003 | Striewski et al. ............... | 521/82 |
| 2011/0174191 A1 | 7/2011 | Umemura | |

FOREIGN PATENT DOCUMENTS

| | | |
|---|---|---|
| JP | 11-207711 A | 8/1999 |
| JP | 2002-508264 A | 3/2002 |
| JP | 2006-205695 A | 8/2006 |
| WO | 2010/001988 A1 | 1/2010 |

OTHER PUBLICATIONS

Machine translation of JP 2006-008971 A to Naruse (Jan. 12, 2006).*

* cited by examiner

*Primary Examiner* — Vu A Nguyen
(74) *Attorney, Agent, or Firm* — Sughrue Mion, PLLC

(57) ABSTRACT

Provided is a production method for particle boards or fiber boards which achieves production efficiency greater than that of conventional production methods. A production method for a particle board or a fiber board, comprising the step of adding polycarboxylic acid into a plant-derived product that has been segmented or formed into fibers, and further comprising the step of adding a small amount a compound having one or more types of an isocyanate group to the plant-derived product and/or the polycarboxylic acid.

10 Claims, 1 Drawing Sheet

MDI ADDITION EFFECT ON IB

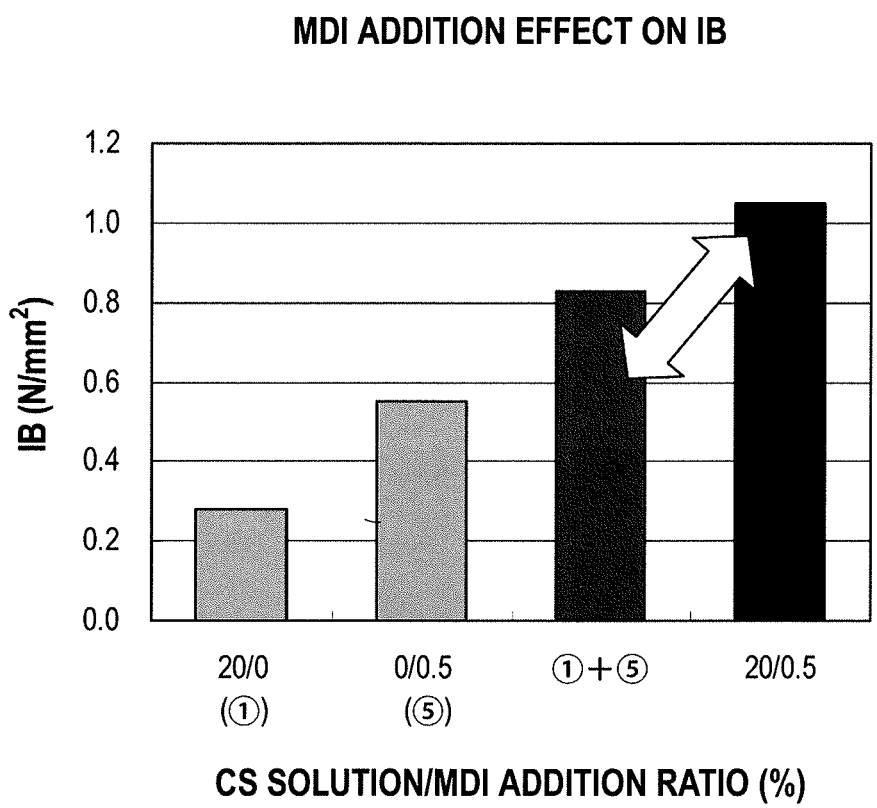

PRODUCTION METHOD FOR PARTICLE BOARD AND FIBER BOARD

CROSS REFERENCE TO RELATED APPLICATIONS

This application is a National Stage of International Application No. PCT/JP2011/075595, filed on Nov. 7, 2011, which claims priority from Japanese Patent Application No. 2011-009924, filed on Jan. 20, 2011, the contents of all which are incorporated herein by reference in their entirety.

TECHNICAL FIELD

The present invention relates to a method for manufacturing a particleboard or fiber board.

BACKGROUND ART

Conventionally, only urea resin, melamine urea, melamine, phenol, and isocyanate type resin adhesives have been employed as the adhesive used in the manufacture of a wood fiber board or particleboard.

However, in view of global environmental problems and future depletion of fossil resources, adhesion technologies that use natural substances which are derived from non-fossil resources are drawing attention. For example, Patent Document 1 discloses a method for manufacturing a formed body that is characterized by including a step of adding a polycarboxylic acid in a solution state to plant-derived material that has been turned into small pieces, and applying heat and pressure.

Further, most present wood materials supplement lumber, which is a recyclable material, with a synthetic adhesive that is derived from fossil resources. In the future it is expected that there will be a strong push to move to natural adhesives. However, generally, wood bonding using naturally-derived substances takes a long time to cure, and in many cases requires a high addition ratio.

PRIOR ART LITERATURE

Patent Literature

[Patent Document 1] WO 2010/001988
[Patent Document 2] JP 2006-205695 A

SUMMARY OF THE INVENTION

Problems to be Solved by the Invention

In order for the particleboard or fiber board, which is a formed body, manufactured based on a conventional method, for example, the method described in Patent Document 1, to exhibit the adhesive strength that is required in practice, a very long hot press time and a very high addition ratio of polycarboxylic acid and sugar are required. These requirements hinder achieving practical manufacturing efficiency and costs.

Therefore, there is a great need for a manufacturing method for realizing manufacturing efficiency and costs that surpass those of the above-described conventional manufacturing method.

Means for Solving the Problems

In view of the above-described circumstances, regarding the manufacture of the above-described particleboard or fiber board, the present inventors investigated adhesives that contribute to improvements in manufacturing efficiency and to a reduction in the amount of used natural adhesive, and to their surprise, discovered that by using a certain kind of adhesive, manufacturing efficiency could be improved and the amount of natural adhesive could be remarkably reduced. By carrying out further diligent research, the present inventors completed the present invention.

Specifically, the present invention relates to a method for manufacturing a particleboard or fiber board, comprising a step of adding a polycarboxylic acid to plant-derived material that has been turned into small pieces or fibers, and a step of adding a small amount of one or two or more of an isocyanate group-containing compound to the plant-derived material and/or polycarboxylic acid.

Further, the present invention relates to the above-described manufacturing method, further comprising a step of adding a sugar to the plant-derived material, the polycarboxylic acid, and the one or two or more of isocyanate group-containing compound.

In addition, the present invention relates to a method for manufacturing particleboard or fiber board using plant-derived material that has been turned into small pieces or fibers, comprising a step of hot press forming a mixture that contains the plant-derived material turned into small pieces or fibers, a polycarboxylic acid, and a small amount of an isocyanate group-containing compound.

Still further, the present invention relates to the above-described manufacturing method, wherein the mixture further contains a sugar.

Yet still further, the present invention relates to any of the above-described manufacturing methods, wherein a weight ratio of the polycarboxylic acid, or the polycarboxylic acid and sugar, to the isocyanate group-containing compound is 100:0.2 to 100:30.

Moreover, the present invention relates to any of the above-described manufacturing methods, wherein the isocyanate group-containing compound has two or more isocyanate groups in a molecule.

Further, the present invention relates to any of the above-described manufacturing methods, wherein the polycarboxylic acid is one or two or more selected from citric acid, itaconic acid, and malic acid.

In addition, the present invention relates to any of the above-described manufacturing methods, wherein the sugar is one or two or more selected from sucrose, xylose, and dextrin.

Still further, the present invention relates to any of the above-described manufacturing methods, wherein an added amount of the polycarboxylic acid or a total added amount of the polycarboxylic acid and the sugar is reduced by the addition of the isocyanate group-containing compound.

Yet still further, the present invention relates to any of the above-described manufacturing methods, wherein a weight ratio of the plant-derived material to the isocyanate group-containing compound is 100:0.1 to 100:3.0.

Moreover, the present invention relates to any of the above-described manufacturing methods, comprising a step of adding a polycarboxylic acid solution or a mixed solution that contains a polycarboxylic acid and a sugar, to the plant-derived material.

Further, the present invention relates to a composite board that uses particleboard or fiber board manufactured by the manufacturing method according to any of the above-described manufacturing methods.

Advantages of the Invention

According to the method for manufacturing particleboard and fiber board of the present invention, by adding a small amount of an isocyanate compound, cross-linking between the polycarboxylic acid and the holocellulose component (cellulose and hemicellulose) of the plant-derived material is supplemented, so that the pressing time required to manufacture the particleboard or fiber board can be shortened by about 20%.

Further, according to the method for manufacturing particleboard and fiber board of the present invention, a synergetic effect is exhibited in the adhesive strength of a formed body such as particleboard or fiber board between the polycarboxylic acid and the isocyanate group-containing compound (hereinafter sometimes referred to as "isocyanate compound"). This not only enables the added amount of polycarboxylic acid used in the manufacture of the particleboard or fiber board to be substantially reduced due to the addition of a small amount of isocyanate compound, but also enables the added amount of other adhesion aids (sugars etc.) to be substantially reduced.

The use of an isocyanate group-containing compound as an adhesion agent to manufacture wood fiber board is, as described in Patent Document 2 for example, publicly known. However, a method for manufacturing particleboard and fiber board like that described above that is based on a synergetic effect between a polycarboxylic acid and an isocyanate compound has heretofore not been reported.

Without being bound to theory, the remarkable effects of the present invention are thought to be exhibited due to the addition of an isocyanate compound that supplements cross-linking between the polycarboxylic acid, which cures slowly, and the woody part of the plant-derived material, causing additional cross-linking to occur.

BRIEF DESCRIPTION OF THE DRAWINGS

FIG. 1 is a diagram illustrating an example of the advantageous effects of the present invention based on internal bonding strength (IB). The arrow in the diagram clearly shows that the IB of the mixed addition board of CS and MDI is substantially larger than the total IB value of the respective single adhesive addition boards of CS and MDI.

MEANS FOR CARRYING OUT THE INVENTION

The method for manufacturing a particleboard or fiber board according to the present invention comprises a step of adding a polycarboxylic acid to plant-derived material that has been turned into small pieces or fibers, and a step of adding a small amount of one or two or more of an isocyanate group-containing compound to the plant-derived material and/or polycarboxylic acid.

Further, the present invention also includes a method for manufacturing a particleboard or fiber board using plant-derived material that has been turned into small pieces or fibers, comprising a step of hot press forming a mixture that contains the plant-derived material turned into small pieces or fibers, a polycarboxylic acid, and a small amount of an isocyanate group-containing compound.

The present invention will now be described in more detail.

In the present specification, unless otherwise stated, the term "parts by weight" refers to the weight ratio of each component used to substantively achieve the object of the present invention.

Further, in the present specification, unless otherwise stated, the term "a small amount (of)" refers to, as the amount of a given component, an amount for a case in which the weight ratio of that component based on the other components used with the given component is a substantially smaller weight ratio than what would normally be expected. In addition, "add" refers to the blending of a given component so that it is used with other components. The term "add" is not limited by the amount of the component, and nor is it limited by the order in which the component is supplied.

(1) Plant-Derived Material

In the present specification, the term "plant-derived material" means material derived from any site of a plant obtained from the xylem, bark, seeds, leaves and the like of vegetation. The plant-derived material may be unused virgin material, waste matter, or reused matter such as recycled material. The plant-derived material may also be derived from one kind of plant, or be a mixture of mater derived from a plurality of kinds of plant.

Further, in the present specification, unless otherwise stated, the weight of the plant-derived material is expressed as the bone-dry weight.

In the present specification, "turn (be turned) into small pieces" means a process in which plant-derived material is cut and shredded into pieces about 0.3 to 2.0 mm thick, 1 to 30 mm wide, and 10 to 100 mm long, for example. Further, in the present specification, "turn (be turned) into fibers" means a process in which plant-derived material is chopped into fiber bundles.

In the present specification, the term "particleboard" means a formed body obtained by making the above-described small pieces stick to each other. Examples of particleboard include a particle board, strand board, wafer board, strand lumber and the like.

In the present specification, the term "fiber board" means a formed body obtained by making the above-described fiber bundles stick to each other. Examples of the fiber board include a medium density fiber board and the like.

In the present specification, the term "composite board" means a board-like formed body obtained by laminating the above-described particleboard and/or fiber board to each other or with plywood and the like.

In the present specification, the size of the plant-derived material turned into small pieces or fibers may be similar to that used in conventional a particleboard, strandboard, or medium-density fiber board.

(2) Isocyanate Group-Containing Compound

The isocyanate group-containing compound used in the present invention is not especially limited, and various publicly-known polyfunctional aliphatic, alicyclic, and aromatic isocyanates can be used. Examples of the isocyanate group-containing compound include hexamethylene diisocyanate (HDI), isophorone diisocyanate (IPDI), 4,4-dicyclohexylmethane diisocyanate (H12MDI), tolylene diisocyanate (TDI), crude tolylene diisocyanate, modified tolylene diisocyanate, 2,4'-diphenylmethane diisocyanate (2,4'-MDI), 2,2'-diphenylmethane diisocyanate (2,2'-MDI), 4,4'-diphenylmethane diisocyanate polymethylene polyphenylene polyisocyanate (polymeric MDI), modified diphenylmethane diisocyanate (carbodiimide-modified, prepolymer-modified etc.), ortho-toluidine diisocyanate (TODI), naphthylene diisocyanate (NDI), xylylene diisocyanate (XDI), lysine diisocyanate (LDI) and the like.

The isocyanate group-containing compound may be used alone or by mixing two or more kinds together.

Further, the isocyanate group-containing compound may be a water dispersible type or a non-water dispersible type.

It is preferred that the isocyanate group-containing compound according to the present invention has two or more isocyanate groups in the molecule. Further, in the present invention, from a handling and operational environment perspective, as well as from the perspective of effectively increasing the strength of the plant-derived material formed product, the isocyanate group-containing compound is preferably 2,4'-MDI, 2,2'-MDI, 4,4'-MDI, and a polymeric MDI mixture (hereinafter, "p-MDI") having three or more benzene rings.

The amount of the isocyanate group-containing compound is not especially limited, as long as such amount can at least cause a reduction in the amount of polycarboxylic acid that is used. For example, the weight ratio of the plant-derived material to the isocyanate group-containing compound is preferably 100:0.1 to 100:3.0, more preferably 100:0.5 to 100:2.0, and much more preferably 100:1.0 to 100:2.0.

Further, in the manufacturing method according to the present invention, the weight ratio of the polycarboxylic acid to the isocyanate group-containing compound is preferably 100:0.2 to 100:30, more preferably 100:1.0 to 100:30, and much more preferably 100:2.0 to 100:25. It is noted that this weight ratio of the polycarboxylic acid to the isocyanate group-containing compound relates to an aspect of the present invention in which a sugar is not used. The weight ratio for when a sugar is used will be described below.

In the present invention, by setting the weight ratio of the isocyanate group-containing compound based on the plant-derived material to 100:0.1 or more, the effect of shortening the pressing time due to the addition of the isocyanate compound is exhibited more reliably. Further, by setting this weight ratio to 100:3.0 or less, the effect of a decrease in the added amount of the polycarboxylic acid is more reliably ensured, and since the costs incurred by the adhesive that is used are substantially reduced, the economics is also better.

(3) Polycarboxylic Acid

In the present specification, the term "polycarboxylic acid" means a compound that has two or more carboxyl groups in the molecule. Examples of the polycarboxylic acid include various straight-chain aliphatic polycarboxylic acids, branched aliphatic polycarboxylic acids, alicyclic polycarboxylic acids, aromatic polycarboxylic acids and the like. Further, the polycarboxylic acid may have a hydroxyl group, a halogen atom, a carbonyl group, a carbon-carbon double bond and the like.

The type of the one or two or more of polycarboxylic acid used in the present invention is not especially limited. It is preferred that the polycarboxylic acid is a solid at ordinary temperature. Especially preferred are citric acid, itaconic acid, and malic acid.

The amount of the polycarboxylic acid is not especially limited. For example, the weight ratio of the plant-derived material to the polycarboxylic acid is preferably 100:1.0 to 100:50, more preferably 100:2.0 to 100:40, and much more preferably 100:2.5 to 100:20.

The polycarboxylic acid may be used in solution, such as in aqueous solution.

(4) Other Components

In the present invention other components may be appropriately added. By further adding a sugar as an adhesive to the plant-derived material that has been turned into small pieces or fibers, curing between the adhesive and the plant-derived material by the sugar is promoted, and as a result, the strength of the cured particleboard or fiber board can be increased. Therefore, in the present invention, it is preferred to use one or two or more of sugar as another component.

The sugar can be added alone in solution, such as in aqueous solution, or can be added to the plant-derived material that has been turned into small pieces or fibers as a mixed solution that contains a polycarboxylic acid solution and/or isocyanate compound.

The kind of sugar used in the present invention is not especially limited. Any of a monosaccharide, an oligosaccharide, and a polysaccharide may be used.

Examples of monosaccharides, oligosaccharides, and polysaccharides that can be used in the present invention will be respectively described below.

Monosaccharides: Xylose, fructose, ribose, arabinose, rhamnose, xylulose, deoxyribose and the like.

Oligosaccharides: Disaccharides such as sucrose, maltose, trehalose, and turanose, fructooligosaccharides, galactooligosaccharides, mannan oligosaccharides, stachyose and the like.

Polysaccharides: Starch, agarose, alginic acid, glucomannan, inulin, chitin, chitosan, hyaluronic acid, glycogen, dextrin, cellulose and the like.

Among these sugars, sucrose, xylose, dextrin are preferred, and sucrose is especially preferred.

The amount of the sugar is not especially limited. For example, the weight ratio of the plant-derived material to the polycarboxylic acid and sugar (which in the present specification is sometimes expressed as "(polycarboxylic acid+sugar)" is preferably 100:5 to 100:50, more preferably 100:5 to 100:40, and much more preferably 100:8 to 100:25.

Further, in the manufacturing method according to the present invention, the weight ratio of the polycarboxylic acid to the sugar for the case when a sugar is used is not limited. Preferably, this weight ratio is 1:0.1 to 1:5, more preferably 1:0.5 to 1:4, and much more preferably 1:1 to 1:4.

In the manufacturing method according to the present invention in which a sugar is used, the amount of isocyanate compound that is used can be appropriately adjusted based on the weight ratio of the polycarboxylic acid to the sugar.

In the manufacturing method according to the present invention, it is preferred that the total amount of the plant-derived material, the polycarboxylic acid, and the isocyanate group-containing compound for when a sugar is not added, and the total amount of the plant-derived material, the polycarboxylic acid, the isocyanate group-containing compound, and the sugar for when a sugar is added, is, respectively, 80 wt. % or more, more preferably 90 wt. % or more, and especially preferably 95 wt. % or more, based on the total amount of the composition.

In the manufacturing method according to the present invention that uses a sugar, it is preferred that the total amount of the polycarboxylic acid and the sugar is less than the amount that is normally used.

Further, in the present invention, within the range that the desired property values can be obtained, it is preferred that the amount of the isocyanate group-containing compound based on the total amount of the polycarboxylic acid and the sugar is small. In the manufacturing method according to the present invention, the weight ratio of (polycarboxylic acid+sugar) to the isocyanate group-containing compound is preferably 100:0.2 to 100:30, more preferably 100:1 to 100:25, and much more preferably 100:2 to 100:20.

In addition, in the manufacturing method according to the present invention that uses a sugar, the weight ratio of the polycarboxylic acid to the isocyanate group-containing compound is preferably 100:0.2 to 100:120, more preferably 100:1.0 to 100:60, and much more preferably 100:2.0 to 100:30.

(5) Steps in the Manufacturing Method According to the Present Invention

In the manufacturing method according to the present invention, a particleboard or fiber board having sufficient strength can be manufactured more efficiently by the same steps as in an ordinary manufacturing method.

Specifically, for example, a particleboard or fiber board can respectively be manufactured by spray coating a polycarboxylic acid solution, or a mixed solution of polycarboxylic acid and sugar, and the isocyanate compound on plant-derived material that has been turned into small pieces or fibers, forming the coated product, and pressing under heat.

The isocyanate group-containing compound may be added alone or as a mixture obtained by mixing the above-described aqueous dispersion with a polycarboxylic acid solution and/or a sugar solution.

Further, the manufacturing method according to the present invention, which is a method for manufacturing a particleboard or fiber board using plant-derived material that has been turned into small pieces or fibers, comprises a step of hot press forming a mixture including plant-derived material that has been turned into small pieces or fibers, a polycarboxylic acid or a polycarboxylic acid and a sugar, and a small amount of an isocyanate group-containing compound. In this method, the order in which each component is blended during production of the mixture, and the components that are blended, are not limited.

Similar to a conventional method for manufacturing a particleboard or wood fiber board, the pressure during the hot press forming may be set at a pressure at which the plant-derived material is sufficiently compressed. More specifically, the pressure may be about 4 MPa to about 7 MPa. Similar to a conventional method, the pressure may be appropriately adjusted based on the target density of the formed product, the density distribution in the thickness direction and the like. Further, during the hot press forming, similar to as described above, a temperature of 160° C. to 250° C. is appropriate, and 180° C. to 220° C. is more preferred.

(6) Particleboard or Fiber Board etc. Manufactured by the Manufacturing Method According to the Present Invention The particleboard or fiber board manufactured by either of the above-described manufacturing methods according to the present invention has the properties that it should normally have. Accordingly, in the manufacturing method according to the present invention, these properties can be attained in a shorter time than in a conventional method.

Examples of the above-described properties that the particleboard or fiber board should normally have include the following.

An internal bonding strength of about 0.8 N/mm2 or more
A bending strength of about 18 N/mm2 or more
A thickness swelling at 20° C. of about 35% or less The above-described properties are all measured based on the methods stipulated in JIS-A5908.

However, even a particleboard or fiber board that does not have these property values should be considered as being encompassed in the scope of the present invention, as long as such particleboard or fiber board essentially comprises all the features of the present invention.

Further, a composite board can be manufactured using the above-described particleboard or fiber board. The method for manufacturing such a composite board is not limited. A manufacturing method that is ordinarily used in the present technological field may be employed.

EXAMPLES

The present invention will now be described in more detail based on the following examples.

Example 1

Effect of Adding a Small Amount of Isocyanate Compound on Properties

The effect on a reduction in the total amount of polycarboxylic acid and sugar required to manufacture a board by adding a small amount of isocyanate compound to an adhesive including a polycarboxylic acid (citric acid) and a sugar (sucrose) was investigated.

(1) Manufacturing Conditions

Particleboard was manufactured based on the following respective manufacturing conditions.

Board specification: Particleboard (single layer), set specific gravity 0.8, board size thickness 9×width 300× length 300 mm
Raw materials: Broadleaf flakes (flaker knife gap 1.1 mm, flake particle size 2 to 9 mm)
Adhesive: Citric acid, sucrose, p-MDI (trade name: WC-300 (manufactured by Nippon Polyurethane Industry Co., Ltd.). Hereinafter referred to as "MDI"))
Citric acid/sucrose mixed solution (hereinafter referred to as "CS solution"; further, citric acid/sucrose is sometimes referred to as "CS")
Citric acid/sucrose mixing ratio: 25/75, CS solution concentration: 59% solid content
MDI: Water-dispersible type, 100% solid content
Solid content addition ratio combination (CS solution/MDI solid content addition ratio (wt. %)): As shown in the following table.

TABLE 1

|   | Solid Content Addition Ratio (CS solution/MDI: wt. %) |
|---|---|
| 1 | 20/0% |
| 2 | 20/0.5% |
| 3 | 20/1.0% |
| 4 | 30/0% |
| 5 | 0/0.5% |
| 6 | 0/1.0% |

Mat water content: 10 to 12%
Pressing temperature 200° C.
Initial pressing pressure: 6 MPa
Pressing time: 560 to 600 seconds (2) Forming Method The above-described broadleaved flakes that had been pre-dried at 105° C. to a bone-dry state were tumbled in a drum blender, and then spray-coated with a CS solution and an MDI adhesive at a solid content addition ratio that was based on a predetermined solid content addition ratio combination. To adjust the mat water content, the 30/0% solid content addition ratio combination was dried to a bone-dry state after coating with CS solution, and then coated with a predetermined amount of water by the drum blender, while the 0/0.5% and 0/1.0% solid content addition ratio combinations were coated with a predetermined amount of water in the drum blender simultaneously with the MDI adhesive. Next, wood flakes coated with the adhesive were weighed so that the density of the hot press formed body was a set value, formed, subjected to pre-pressing with a cold press, and then subjected to hot press forming with a hot press under the above conditions.

(3) Property Evaluation

The various properties of the particleboard were measured based on JIS-A5908.

(4) Results and Consideration

A list of the test results is shown in Table 1.

It can be seen that by adding 0.5 to 1.0 wt. % of MDI, the internal bonding strength increased about four-fold and bending strength by about 1.3 fold, thus showing that the improvement in internal bonding strength was especially large (Table 2).

A comparison of the sum of the internal bonding strengths (IB) for the single adhesive addition boards of CS and MDI with the value for the mixed addition board showed that the mixed addition board had an internal bonding strength that was about 28% higher, suggesting that extra cross-linking was occurring due to the addition of MDI. (Table 3, and FIG. 1).

When 20% of CS solution was added, roughly the same effect was seen for the internal bonding strength, the bending strength, and the thickness swelling at 20° C., respectively, when 1.0 wt. % of MDI was added as when 10 wt. % of CS solution was added (Table 4), thereby confirming that the addition ratio of CS solution needed to obtain the properties required for practical use could be reduced from 30 wt. % to 20 wt. %.

Further, the above 1.0 wt. % of MDI is substantially smaller than the 2 to 4 wt. % of MDI that is normally used. Considering that the normally used amount of a urea-based adhesive is about 10 wt. %, this can be said to be an extremely remarkable effect.

TABLE 1

List of properties of a board to which a small amount of isocyanate compound has been added

| Sample ID | Adhesive Addition Conditions | | | Density (g/cm³) | Moisture Content (%) | Internal bonding strength (N/mm²) | Bending Strength (N/mm²) | Thickness Swelling at 20° C. (%) |
| --- | --- | --- | --- | --- | --- | --- | --- | --- |
| | Citric Acid Ratio (%) | CS Addition Ratio (%) | MDI Addition Ratio (%) | | | | | |
| 1 | 25 | 20 | 0.0 | 0.78 | 7.4 | 0.28 | 14.2 | 78.2 |
| 2 | 25 | 20 | 0.5 | 0.78 | 5.9 | 1.05 | 18.4 | 33.2 |
| 3 | 25 | 20 | 1.0 | 0.77 | 6.0 | 1.15 | 18.8 | 29.3 |
| 4 | 25 | 30 | 0.0 | 0.82 | 5.7 | 1.24 | 19.8 | 28.1 |
| 5 | 0 | 0 | 0.5 | 0.83 | 7.9 | 0.55 | 11.9 | 44.7 |
| 6 | 0 | 0 | 1.0 | 0.81 | 7.9 | 0.61 | 15.4 | 31.4 |

TABLE 2

Improvement in Strength Performance due to MDI Addition

| Addition Ratio (%) | | Performance Comparison With MDI Non-Addition | |
| --- | --- | --- | --- |
| CS | MDI | Internal bonding strength | Bending Strength |
| 20 | 0.5 | 3.8 fold | 1.3 fold |
| | 1 | 4.1 fold | 1.3 fold |

TABLE 3

Effect of Adding MDI on Internal Bonding Strength

| MDI Addition Ratio (%) | Sample ID | Internal Bonding Strength (N/mm²) | Strength Comparison |
| --- | --- | --- | --- |
| 0.5 | 1 | 0.28 | |
| | 5 | 0.55 | |
| | 1 + 5 | 0.83 | 100 |
| | 2 | 1.05 | 127 |
| 1.0 | 1 | 0.28 | |
| | 6 | 0.61 | |
| | 1 + 6 | 0.89 | 100 |
| | 3 | 1.15 | 129 |

TABLE 4

Improvement in Properties For 1.0% MDI and 10% CS

| | Internal Bonding Strength (N/mm²) | Bending Strength (N/mm²) | 20° C. TS (%) |
| --- | --- | --- | --- |
| For 1.0% MDI | 0.9 | 4.6 | 48.9 |
| For 10.0% CS | 1.0 | 5.6 | 50.1 |

Example 2

Effect of Adding a Small Amount of Isocyanate Compound on Curing Properties During Pressing The effect on a shortening in the pressing time required to manufacture a board by adding a small amount of isocyanate compound to an adhesive including a polycarboxylic acid (citric acid) and a sugar (sucrose) was investigated.

(1) Manufacturing Conditions

Board specification: Particleboard (single layer), set specific gravity 0.8, board size thickness 9×width 300× length 300 mm Raw materials: Broadleaf flakes (flaker knife gap 1.1 mm, flake particle size 2 to 9 mm)

Adhesive: Citric acid, sucrose, p-MDI (trade name: WC-300 (manufactured by Nippon Polyurethane Industry Co., Ltd.). Hereinafter referred to as "MDI"))

Citric acid/sucrose mixed solution (hereinafter referred to as "CS solution")

Citric acid/sucrose mixing ratio: 25/75, CS solution concentration: 59% solid content MDI: Water-dispersible type, 100% solid content Solid content addition ratio combination (CS solution/MDI solid content addition ratio (wt. %)): As shown in the following table.

| | Solid Content Addition Ratio (CS solution/MDI: wt. %) |
| --- | --- |
| 1 | 30/0% |
| 2 | 20/0.5% |
| 3 | 15/1.0% |

Mat water content: 10 to 13%

Pressing temperature 200° C.

Initial pressing pressure: 6 MPa

Pressing time: As shown below

|   | Pressing Time (seconds) |
|---|---|
| 4 | 360 |
| 5 | 480 |
| 6 | 540 to 600 |

(2) Forming Method

The above-described broadleaved flakes that had been pre-dried at 105° C. to a bone-dry state were tumbled in a drum blender, and then spray-coated with a CS solution and an MDI adhesive at a solid content addition ratio that was based on a predetermined solid content addition ratio combination. To adjust the mat water content, the 30/0% predetermined solid content addition ratio combination was dried to a bone-dry state after coating with CS solution, and then coated with a predetermined amount of water by the drum blender, while the 15/1.0% combination was coated with a predetermined amount of water in the drum blender simultaneously with CS solution. Next, wood flakes coated with the adhesive were weighed so that the density of the hot press forming was a set value, formed, subjected to pre-pressing with a cold press, and then subjected to hot press forming with a hot press under the above conditions.

(3) Property Evaluation

The various properties of the particleboard were measured based on JIS-A5908.

(4) Results and Consideration

A list of the test results is shown in Table 5.

The higher the MDI addition ratio in the board, the greater the improvement in internal bonding strength, bending strength, and thickness swelling at 20° C. tended to be. Especially, the shorter the pressing time, the greater the improvement. This is thought to be due to the effects of the fast-curing MDA adhesive supplementing the lack of binding between the citric acid/sucrose and the woody parts.

Especially, by adding 1.0 wt. % of MDI to a solution to which 15 wt. % of CS had been added, the required pressing time to achieve the strength performance and water resistance that were achieved by pressing for 600 seconds when 30 wt. % of just CS solution was added was 480 seconds. Namely, by replacing half of the CS solution with ¹⁄₁₅ that amount of MDI, the required pressing time to achieve the same strength performance and water resistance was shortened by 20%.

(Discussion)

Based on the manufacturing method according to the present invention, it is clear that the addition ratio of polycarboxylic acid (and a sugar) can be reduced and the time required for hot press forming can be shortened compared with when manufacturing a particleboard and fiber board using naturally derived substances, such as polycarboxylic acid (and a sugar), for the adhesive.

It is noted that although in the above tests a sugar was added to promote binding between the polycarboxylic acid and the woody parts, even if a sugar is not used and only a polycarboxylic acid is present, especially if a sugar other than a holocellulose component (cellulose and hemicellulose) is present in the plant-derived material, the effect of adding the isocyanate group-containing compound can be considered to be the same as that confirmed in the above tests.

Industrial Applicability

Based on the manufacturing method according to the present invention, compared with manufacturing a particleboard or fiber board using naturally derived substances, such as polycarboxylic acid (and a sugar), for an adhesive, the time required for hot press forming can be shortened and the addition ratio of the naturally derived substances can be substantially reduced. Therefore, the present invention will greatly contribute to the development of the particleboard and fiber board manufacturing industry and related industries.

The invention claimed is:

1. A method for manufacturing particleboard or fiber board comprising a step of adding a polycarboxylic acid to plant-derived matter that has been turned into small pieces or fibers, further comprising a step of adding a small amount of one or two or more of an isocyanate group-containing compound to the plant-derived matter and/or polycarboxylic acid, wherein a weight ratio of the plant-derived matter to the isocyanate group-containing compound is 100:0.1 to 100:3.0, and wherein a weight ratio of the polycarboxylic acid to the isocyanate group-containing compound is 100:0.2 to 100:30.

2. The manufacturing method according to claim 1, further comprising a step of adding a sugar to the plant-derived matter, the polycarboxylic acid, and the one or two or more of isocyanate group-containing compound.

3. A method for manufacturing particleboard or fiber board using plant-derived matter that has been turned into small pieces or fibers, comprising a step of hot press forming a

TABLE 5

List of properties of a board to which a small amount of isocyanate compound has been added

| Sample ID | Adhesive Addition Conditions | | | Pressing Time (seconds) | Moisture Content (%) | Internal Bonding Strength ($N/mm^2$) | Bending Strength ($N/mm^2$) | Thickness Swelling at 20° C. (%) |
|---|---|---|---|---|---|---|---|---|
|  | Citric Acid Ratio (%) | CS Addition Ratio (%) | MDI Addition Ratio (%) |  |  |  |  |  |
| 1-4 | 25 | 30 | — | 360 | 6.3 | 0.16 | 8.8 | Test sample destroyed |
| 1-5 | 25 | 30 | — | 480 | 5.8 | 0.74 | 15.0 | Test sample destroyed |
| 1-6 | 25 | 30 | — | 600 | 5.3 | 1.14 | 18.7 | 35.4 |
| 2-4 | 25 | 20 | 0.5 | 360 | 7.0 | 0.20 | 10.7 | 84.1 |
| 2-5 | 25 | 20 | 0.5 | 480 | 6.4 | 0.73 | 13.9 | 46.2 |
| 2-6 | 25 | 20 | 0.5 | 560 | 5.9 | 1.05 | 18.4 | 33.2 |
| 3-4 | 25 | 15 | 1.0 | 360 | 6.8 | 0.45 | 12.4 | 45.2 |
| 3-5 | 25 | 15 | 1.0 | 560 | 6.2 | 0.96 | 17.4 | 32.4 |
| 3-6 | 25 | 15 | 1.0 | 600 | 6.2 | 1.21 | 19.1 | 29.4 | mixture that contains the plant-derived matter turned into small pieces or fibers, a polycarboxylic acid, and a small amount of an isocyanate group-containing compound, wherein a weight ratio of the plant-derived matter to the isocyanate group-containing compound is 100:0.1 to 100:3.0, and wherein a weight ratio of the polycarboxylic acid to the isocyanate group-containing compound is 100:0.2 to 100:30.

4. The manufacturing method according to claim 3, wherein the mixture further contains a sugar.

5. The manufacturing method according to claim 1, wherein the isocyanate group-containing compound has two or more isocyanate groups in a molecule.

6. The manufacturing method according to claim 1, wherein the polycarboxylic acid is one or two or more selected from citric acid, itaconic acid, and malic acid.

7. The manufacturing method according to claim 2, wherein the sugar is one or two or more selected from sucrose, xylose, and dextrin.

8. The manufacturing method according to claim 1, comprising a step of adding a polycarboxylic acid solution or a mixed solution that contains a polycarboxylic acid and a sugar, to the plant-derived matter.

9. A composite board comprising a particleboard or fiber board manufactured by the manufacturing method according to claim 1.

10. The manufacturing method according to claim 2, wherein a weight ratio of the polycarboxylic acid and sugar to the isocyanate group-containing compound is 100:0.2 to 100:30.

* * * * *